Feb. 12, 1963 T. FÖLSCHE 3,077,195
RADIATION DEVICE PARTICULARLY FOR MEDICAL PURPOSES
Filed May 14, 1959 2 Sheets-Sheet 1
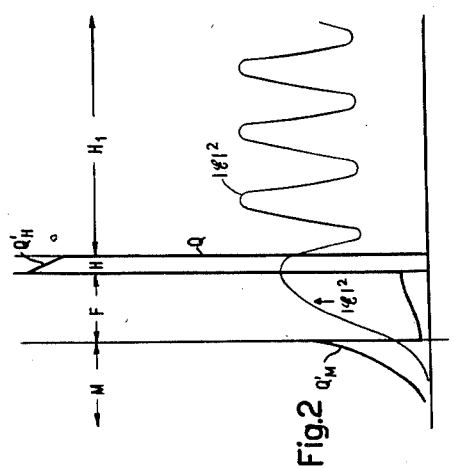
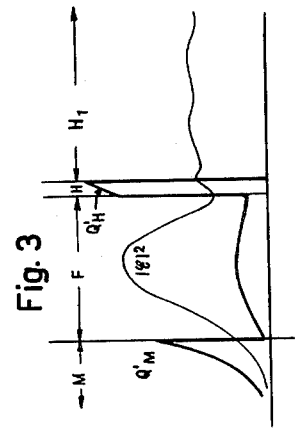
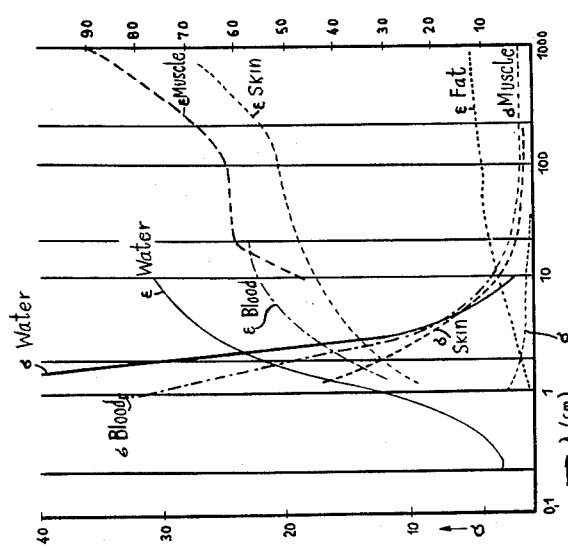
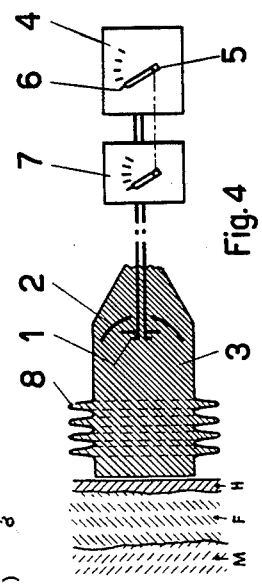

Feb. 12, 1963  T. FÖLSCHE  3,077,195
RADIATION DEVICE PARTICULARLY FOR MEDICAL PURPOSES
Filed May 14, 1959  2 Sheets-Sheet 2

United States Patent Office 3,077,195
Patented Feb. 12, 1963

3,077,195
RADIATION DEVICE PARTICULARLY FOR
MEDICAL PURPOSES
Trutz Fölsche, 2001 Snow Drive, Alamogordo, N. Mex.
Filed May 14, 1959, Ser. No. 813,266
3 Claims. (Cl. 128—404)

The invention relates to radiating and transmitting devices particularly for medical and therapeutical purposes operating with electromagnetic waves in the m.-, dm.-, or cm.-range i.e. with ultrahigh or superhigh frequencies.

This application is a continuation-in-part of my copending application, filed July 19, 1954, Serial No. 444,259, and now abandoned.

Devices of this type are often used for heating the inner layers of a multilayer arrangement. The radiator itself is preferably embedded within a matching medium.

It is an object of the invention to obtain a large heating effect in the depth of the arrangement at the surface of the inner or lower layer i.e. a depth effect by raising the temperature of the inner dissipative layers, which effect is independent of the thickness of the upper or outer layer or layers and as uniform as possible. It is a further object to improve the efficiency as far as possible.

Several modes of carrying out the invention are described in connection with the example of the human body, but it must be pointed out that the invention is not limited thereto and can be applied in a similar manner to other multilayer bodies for example to glued wood or to bodies having layers of different electric or magnetic losses or to arrangements including layers of plastic masses, or artificial substances.

In most cases the human body comprises a number of layers including a muscular substance or inner organs constituting an innermost layer which shall be heated and which is covered by a layer of fat or variable thickness and a layer of skin.

Investigations have shown that the maximal dose of the depth effect in the upper region of the muscular substance is limited by the maximal dose which can be passed through the skin without overheating or overstraining. The skin is particularly strained when ultrahigh frequency waves are applied and the thickness of the layer of fat equals $\lambda/4$ in fat because the skin is then located in an antinode of the stationary electric field distribution in fat.

The skin is heated 5 to 7 times as much as the muscular substance when the layer of fat has such a thickness. For a vacuum wave length of 1 m. the $\lambda/4$ in fat equals about 7 cm. and for a vacuum wave length of 10 cm. the value of $\lambda/4$ in fat is only 0.9 cm. The fat tissues of the body have dimensions which are of the order of magnitude of one or several $\lambda/4$ in fat. If therefore a constant fixed frequency is used the maximal dose of the depth effect cannot be higher than $\frac{1}{5}$ or $\frac{1}{7}$ of the allowable dose which can safely be applied to the skin for all possible thicknesses of the fatty layers.

It is therefore an object of the invention to provide means preventing an overstraining or overheating of the skin. It will be seen that a high heating of the skin in comparison to the muscle will not be present when the skin is located at a nodal point of the stationary electrical field distribution in fat.

It is therefore a further object of the invention to make the operating frequency variable and to adjust it periodically or continuously to a value for which half the wave length or a multiple thereof in the respective medium, for example fat, is equal to the thickness of the layer of this medium. By using such a frequency a four or five times higher dose of the depth effect may be obtained without overstraining the skin.

It is a further object of the invention to embed the radiator into a medium having low losses and having the dielectric coefficient of the outermost layer i.e. of the skin and to match the internal resistance of the transmitter to this embedded radiator. The matching has the effect, that the internal resistance of the transmitter is so transformed that for an infinitely long wave conductor or for free radiation into an unlimited medium skin the transmitter delivers its maximal energy. With such an arrangement the largest part of the energy radiated by the transmitter passes through the maximally pervious layer of fat which has no transforming effect with a thickness of $\lambda/2$ of fat. The thickness of the layer of fat may be estimated before using the device and the frequency of the transmitter is adjusted accordingly. It is also possible to operate with a periodically changing frequency, the range of frequency deviation being chosen in such a manner that the thickness of the layer of fat within the respective wave range is equal to $\lambda/2$ of fat or to a whole numbered multiple thereof.

It is a further object to arrange the radiating device in such a manner that one or more basic frequencies together with their upper harmonics may be adjusted so that the value of $\lambda/2$ in fat covers the range from 0 to about 10 cm.

Another way of obtaining a depth effect which is independent of the varying thickness of the intermediate layers, and to produce the possibility of dosing the depth effect independent of the sensation or feeling at the skin comprises embedding the radiator into a low loss medium having the field wave resistance $$\sqrt{\frac{\epsilon}{\mu}}$$

of the intermediate layer or in application to the human body the same dielectric coefficient as fat and to match the internal resistance of the transmitter to this embedded radiator or wave conductor. This has the advantage that the transformation effect of the fat is nearly completely eliminated. In order to improve this arrangement further a low loss dielectric substance having a dielectric coefficient substantially equal to that of the skin may be arranged between the medium of the radiator and the skin. This dielectric substance together with the skin shall have a thickness of $\lambda/2$ in skin or of a whole numbered multiple thereof. The thickness of this layer is preferably adjustable. By inserting this additional layer through which the rays can pass freely with the exception of a certain dampening effect the same conditions are obtained as if the skin would not be present i.e. if the embedding medium fat of the radiator would be directly coupled to the fatty layer of the body. The reflections at the plane of contact between the low loss medium of the radiator and the fatty layer of the body are very small; the maximal dose which can be applied to the muscle lying deep below the fat is nearly independent of the thickness of the layer of fat.

Further features and objects of the invention will be apparent from the following description of several embodiments thereof taken in connection with the drawings, in which—

FIG. 1 shows a diagram representing the dielectric coefficient $\epsilon$ and the conductivity $\sigma$ as a function of the wave length $\lambda$ in cm. on a logarithmic scale;

FIGS. 2 and 3 show diagrams for different arrangements of layers;

FIG. 4 shows a schematic view of a radiator head according to the invention;

Figure 5:
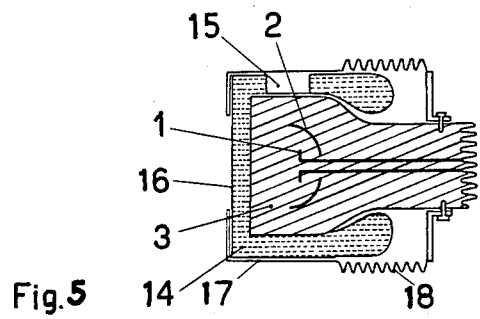
FIG. 5 shows a longitudinal section through a head including a dipole and a reflector.

The diagram of FIG. 1 shows the values $\epsilon$ of the dielectric coefficient for water, fat, skin, blood and muscular substance. It gives also the values of the conductivity $\sigma$ of these substances as a function of the wave length $\lambda$ in cm. The values of $\epsilon$ of the substances which should be used for embedding the radiator can be derived from this diagram so that the radiator can be embedded into a medium having the value $\epsilon$ for skin at the particular frequency. The medium may consist f.i. of paraffine or a transformer oil including a ceramic material of high dielectric coefficient in form of a powder. From this figure, it will be seen that the dielectric coefficient of fat is substantially from 7 to 10 at wave lengths from 10 to 100 cm. and that the dielectric coefficient of skin is substantially from 45 to 55 at wave lengths of from 10 to 100 cm.

FIG. 2 represents an arrangement of a number of layers in which the muscular substance M is located on the left hand side. Then follows a layer of fat F and a layer of skin H. The radiator is located within a medium $H_1$ on the right hand side of the diagram. The heavy line Q indicates the amount of heat produced in the various layers while the line $$|\mathscr{E}^2|$$

indicates the square of the field strength. The layer of fat has such a dimension in FIG. 2 that the layer of skin is located in an antinode of the stationary wave which is used in this particular case. In consequence thereof the skin is heated up very strongly and to a much higher temperature than the muscular substance.

FIGURE 3 shows a condition in which the thickness of the fatty layer is just equal to $\lambda/2$ in fat of the radiated wave. The skin is now located at a node of the stationary wave and the heating is much less. The dose at the surface of the muscular substance has the same value in both figures.

FIGURE 4 shows one of the embodiments of the invention. It may be used in connection with any known kind of generator producing electromagnetic waves of ultrahigh or superhigh frequencies. Such generators are well known in the art in a number of varieties, e.g., magnetron generators, disk triodes or other known arrangements producing electromagnetic waves of five to hundred cm. vacuum wave-length with adequate power.

The head of the therapeutic device may be formed as indicated in FIGURE 4 in that a radiator 1 having a reflector 2 is embedded into a medium 3. The "radiator" in this case in which a transmitter with several frequencies is used may contain a number of independent $\lambda/2$-dipoles tuned to several different wave-lengths of the transmitter; the dipoles may be arranged perpendicularly to the axis of the parabolic reflector at suitable distances from the reflector and disposed obliquely to each other as far as possible. The medium embedding the dipoles, the reflector and the transmission line matched to the impedance of the dipoles has the dielectric coefficient of the skin and low losses. The transmitter 4 may be adjusted to various frequencies by means of a knob 5. It may be adjusted together with the radiator by means of the matching device 7 to a basic wave or to different harmonics thereof. The $\lambda/2$ dipoles may have the corresponding effective length $\lambda/2$ in the embedding medium. The matching device 7 has the following functions:

(1) Together with the adjustment of the transmitter to one of the various frequencies, the corresponding radiator dipole is connected to the transmission line. This connection may be effected by introducing the end of the transmission line along the axis of the reflector into the head so that the terminals of the line are connected to both arms of the corresponding $\lambda/2$ dipole.

(2) The matching device 7 provides for such coupling between the resonant circuit of the transmitter to the transmission line that the impedance of the transmitter is matched to the characteristic impedance of the transmission line. Suitable transformers for one predetermined frequency are well-known components in ultrashort wave equipment. The resonance circuit of a disk tube may, for example, consist of a cylindrical tube closed at both ends with two coaxial shafts from both sides inside the cylinder. The coupling and matching of the transmitter to the characteristic impedance of the transmission line is made either capacitatively by means of a pin in a suitable location in the electric field or inductively by means of a loop in the magnetic field. If the resonance circuit is energized by harmonics, the coupling and transforming element must be changed by adjusting the matching device 7 to match the circuit impedance to the characteristic impedance of the transmission line.

If the transmitter contains one single amplifier stage with a fixed circuit and adjusted coupling (element) for every harmonic, the matching device 7 provides the connection between the transmission line and the corresponding stage, and also effects the switching-on of the stage. By means of the device 7 therefore the radiator 1 is energized with the basic frequency or with a higher harmonic thereof. The scale 6 may be calibrated in thickness values of the fat. An instrument indicating standing waves on the transmission line and a skin phantom—that is a thick layer with the dielectric coefficient of skin and suitable losses—fixed on top of the head may be provided for checking the adjustment for the different frequencies before therapeutic application.

The generator, the power control and the indicating instruments are known compoents in ultrashort wave equipment, are not claimed as new in the application, and are therefore not described in detail.

In order to match the device to different thicknesses of the layer of fat it may be preferable to provide the transmitter with a device for continuously changing the frequency or to provide an additional transmitter adjusted to a second basic frequency. In the latter case it is preferable to arrange a second radiator within the head. It is also possible to employ exchangeable heads matched to different frequencies which are chosen according to the required wave length.

The embedding medium 3 may have such a dimension in the direction of the radiation that the body has such a distance from the metal parts of the radiator when the head is applied to the body that the field in the plane of contact is essentially homogeneous. Short distances between the radiator 1 and the plane of contact should be avoided. In case the field is not sufficiently homogeneous in the body it may also be advisable to employ a layer of variable thickness in front of the radiator. This layer may consist of a liquid or elastic substance having a suitable dielectric coefficient and low losses. The embedding fluid may be arranged within an extensible bellows 8 so that the distance between the radiator and the skin can be changed by a pressure upon the bellows when the head is applied to the body. The embedding fluid may also be used for heating or cooling purposes and may be made to circulate through the head for this purpose.

If the thickness of the layer of fat is known at least approximately then it is possible to adjust the frequency of the transmitter to an extreme value of skin heating at a constant energy of the transmitter.

The arrangement is of particular importance in connection with devices operating in the range of wave lengths between 100 cm. and 10 cm. For wave lengths smaller than 30 on the energy loss in the muscle becomes larger and larger so that it is possible to irradiate only the uppermost regions of the muscular layer and to prevent that the deeper regions are irradiated.

The device has the advantage that nearly the total maximal energy of the transmitter is radiated into the body.

FIGURE 5 shows a head in which the radiator is embedded within a low loss substance having the same dielectric coefficient as the layer of fat. The head includes an intermediate layer 14 in front of the radiator enclosed within a bellows-shaped container so that the thickness of the intermediate layer can be changed. The substance 14 within the bellows has approximately the dielectric coefficient of the skin and consists for instance of oil and a ceramic powder. The head is closed by a diaphragm 16 consisting for example of a foil of polystyrol. A metal cap 17 surrounds the head completely or partly and is connected with the handle of the head by way of an elastic member 18. Distance pieces 15 are provided for guiding the housing against the medium 3.

In the operation of the device the foil 16 of the head is applied to the respective part of the body. Then the head is pressed down more or less or it may be moved periodically by a pumping or expanding device so that the thickness of the layer of the medium 14 is continuously changed. It is thereby ascertained that values of the thickness are produced lying near λ/2 of the skin or near a whole numbered multiple thereof.

An additional layer of constant thickness may be employed if the thickness of the skin of the respective area of the body is always the same or sufficiently exactly known.

The fluid 14 in the bellows is circulating in consequence of the pumping movement so that a cooling effect is obtained.

Figure 6:
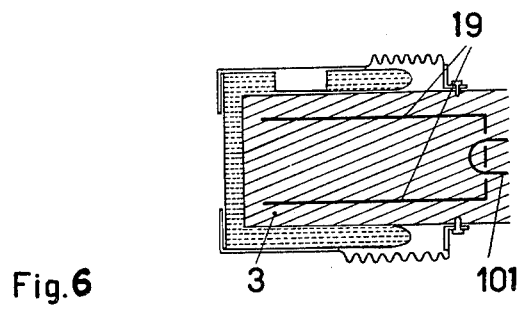
FIG. 6 shows a longitudinal section through a similar head including a wave conductor and FIG. 7 shows a longitudinal section through another embodiment of the head including a hollow tube acting as radiator.

The arrangement of FIG. 6 includes a wave conductor embedded within the medium 3 and consisting of conductors 19. A coupling loop 101 is used for feeding the oscillating energy.

Figure 7:
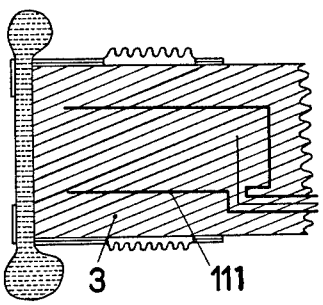

FIG. 7 shows an arrangement in which the radiator has the form of a rectangular or circular hollow tube 111. The metal parts are embedded within a medium 3 having the characteristic impedance of the fat. The layer in front of the medium 3 has a characteristic impedance corresponding to the skin.

The radiator may also have the shape of a horn in order to reduce interferences near the opening of the radiator.

The device has the following advantages: The doses of the transmitted energy at the surface of the inner layer are independent of the thicknesses of the fat or skin with the exception of damping losses. It is possible to produce a uniform dose of the depth effect by employing a slow movement of the head and pulsating the additional layer over such parts of the body in which the thickness of the fat and of the skin varies over the area. The efficiency is high also in case a transmitter of constant frequency is used. The head has handy dimensions. The dosing may be controlled by watching the energy of the transmitter since the dose of the depth effect is always the same for various thicknesses of the fat or decreases with the thickness according to a simple law.

It would be absolutely unreliable to dose the energy according to the sensation at the skin; when the skin is located in an antinode of the stationary wave in fat (λ/4 in fat=0.95 cm. thickness of the fat at a wave length λ=10 cm. in vacuum) the heating will be approximately 6.3 times larger than the heating of the uppermost surface of the muscle layer; in the node of the stationary wave, however (λ/2 in fat=1.9 cm. thickness of fat), it will be only 1.7 times as large. If the intensity would be adjusted in both cases to the same sensation at the skin the two doses would have a ratio of 1:3.7, i.e. the dose of the depth effect for the larger thickness of fat would be 3.7 times larger than for the smaller thickness of fat.

The heads of FIGURES 5, 6 and 7 can be used with one predetermined frequency of the generator 4 for which they are designed. The coupling transformer disposed between the transmitter and the transmission line must be adjusted so that the impedance of the transmitter is adapted to the characteristic impedance of the cable. The characteristic impedance of the cable is adapted by the coupling element of the head to the impedance of the radiator if this radiator is embedded in an "infinite" layer of fat. For adjustment, the skin layer in front of the fat medium 3 must be replaced by a fat phantom.

A matching device 7 in connection with a radiator similar to 1 consisting of several dipoles embedded in fat can be used for improving the effectiveness by varying the frequency.

The invention may also be used for preventing reflections from multilayer bodies having a strongly absorbing surface layer. The combination of layers including a λ/4 fat layer and an absorbing skin layer decreases the reflection of the total combination to a large degree, as the heat energy produced within the skin is not taken from the depth effect but is supplied by the generator so that the reflection of the arrangement is reduced. It is to be noted that the low loss matching medium in which the radiation means is embedded should have a dielectric coefficient of from 45 to 55 at wave lengths from 10 to 100 cm. in order to minimize reflection on the surface of the skin of the body. A corresponding arrangement may be used for covering a body which is irradiated with ultrashort waves and shall not reflect these waves.

I claim:

1. A transmitting device for medical use for applying electromagnetic ultrahigh and superhigh frequencies to an inner muscular dissipative layer of an animate body through layers of skin and fat, said device comprising radiating means, means for supplying electromagnetic oscillations to said radiating means, said radiating means being embedded within a low loss matching medium having a dielectric coefficient of substantially 7 to 10 at wave lengths of from 10 to 100 cm., and an additional layer having a dielectric coefficient substantially from 45 to 55 at wave lengths from 10 to 100 cm. positioned to lie between the matching medium and the skin when the transmitting device is in use.

2. A transmitting device according to claim 1, wherein the additional layer having substantially the dielectric coefficient of from 45 to 55 at wave lengths from 10 to 100 cm. has an adjustable thickness and means is provided as a part of the transmitting device for adjusting the thickness of said additional layer at least temporarily to supplement the skin layer of the body by said additional layer to a thickness of half the wave length of the electromagnetic oscillations in skin or a whole numbered multiple thereof.

3. A transmitting device according to claim 1, wherein the matching medium is substantially solid and the additional layer comprises a deformable medium.

References Cited in the file of this patent

UNITED STATES PATENTS

| 1,951,731 | Kassner | Mar. 20, 1934 |
| 2,161,292 | Hahnemann | June 6, 1939 |
| 2,407,690 | Southworth | Sept. 17, 1946 |
| 2,503,278 | Lindahl | Apr. 11, 1950 |
| 2,814,298 | Argento | Nov. 26, 1957 |

FOREIGN PATENTS

| 654,673 | Germany | Dec. 9, 1937 |